United States Patent [19]
Ishikura et al.

[11] Patent Number: 5,558,405
[45] Date of Patent: Sep. 24, 1996

[54] PROTECTIVE FRAME FOR STROLLER

[75] Inventors: Takashi Ishikura; Hayato Takahashi, both of Tokyo, Japan

[73] Assignee: Combi Corporation, Tokyo, Japan

[21] Appl. No.: 308,433

[22] Filed: Sep. 19, 1994

[30] Foreign Application Priority Data

Sep. 30, 1993 [JP] Japan .................................. 5-057341

[51] Int. Cl.⁶ .................................................. A47D 15/00
[52] U.S. Cl. .............................. 297/487; 280/38; 403/182
[58] Field of Search ................................ 297/487, 488, 297/236.15; 280/47, 38, 642; 403/79, 180, 182, 183, 327

[56] References Cited

U.S. PATENT DOCUMENTS

| | | | |
|---|---|---|---|
| 2,299,357 | 10/1942 | Strunk et al. | 403/182 |
| 2,362,856 | 11/1944 | Strunk et al. | 403/182 |
| 4,662,683 | 5/1987 | Knoedler et al. | 297/488 |
| 4,679,806 | 7/1987 | Gingline | 280/47.38 |
| 4,754,999 | 7/1988 | Kain | 297/250 |
| 4,832,361 | 5/1989 | Nakao et al. | 280/642 |
| 4,986,690 | 1/1991 | Cooksey | 403/327 |
| 4,989,891 | 2/1991 | Huang | 280/47.38 |
| 5,080,439 | 1/1992 | Takahashi et al. | 297/487 |

*Primary Examiner*—Peter M. Cuomo
*Assistant Examiner*—Anthony D. Barfield
*Attorney, Agent, or Firm*—Sughrue, Mion, Zinn, Macpeak & Seas

[57] ABSTRACT

A protective frame for a stroller including a seat portion, a pair of armrest poles disposed on opposite sides of the seat portion, a pair of retaining bodies releasably attached to the armrest poles, respectively, a pair of rigid pole bodies coupled to the retaining bodies, respectively, and a joint mechanism for joining ends of the pole bodies together, and for being detachable into two separate joint portions.

8 Claims, 3 Drawing Sheets ically, the two split pole bodies 11 and 12 are held by
PROTECTIVE FRAME FOR STROLLER

FIELD OF THE INVENTION

The present invention generally relates to a protective frame for a stroller and, more particularly, to a protective frame for a stroller that can prevent a baby from falling from a seat by attaching a protective frame in such a manner as to span between the ends of stroller armrest poles.

BACKGROUND OF THE INVENTION

The attachment of a protective frame to the ends of armrest poles in order to prevent a several-month-old baby from falling forward off of a stroller seat is disclosed in, e.g., Japanese Unexamined Utility Model Publication No. 4-88570.

However, this protective frame is formed of a single rod-like body whose length corresponds to a distance between the two confronting armrest poles, and both ends of the protective frame are releasably attached to the ends of the armrest poles. As a result of such construction, every time the baby is to be seated or unseated, the protective frame spanning between the armrest poles must be released, which is an extremely cumbersome operation.

In addition, the stroller is cumbersome in that it lacks not only a space for maintaining the released protective frame but also a means for carrying the released protective frame when the protective frame is to be temporarily released from the stroller. As a result, the user must either leave the protective frame attached to the ends of the arrest poles or remove the protective frame completely.

SUMMARY OF THE INVENTION

Accordingly, one object of the present invention is to provide a device which overcomes the above problem. According to an embodiment of the invention, a stroller protective frame is provided which is capable of opening the front of the seat with both ends of the protective frame attached to the ends of the armrest poles. This is accomplished by arranging a single rod-like formed protective frame which is able to be split into two parts in the middle thereof, whereby a baby can be seated or unseated with extreme ease.

Another object of the present invention is to provide a protective frame for a stroller capable of suspending the two split protective frame parts from the ends of the two confronting armrest poles in order to provide a space for holding the protective frame when the stroller is to be used with the front of the seat opened.

The protective frame for a stroller according to an embodiment of the invention is characterized in that a middle portion thereof is arranged so as to be split into two pole bodies by a joint mechanism; and retaining bodies are coupled to base end portions of the respective pole bodies, the respective retaining bodies being releasably attached to ends of armrest poles.

DETAILED DESCRIPTION OF A PREFERRED EMBODIMENT

An embodiment of a device according to the invention will now be described with reference to the drawings.

Figure 1:
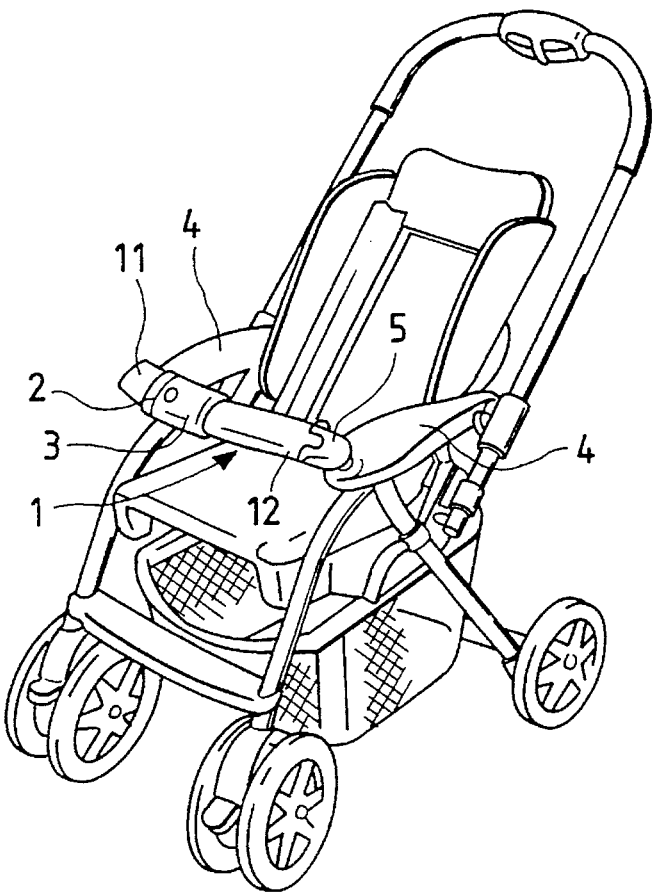
FIG. 1 is a perspective view showing a stroller with a protective frame attached thereto.
Figure 2:
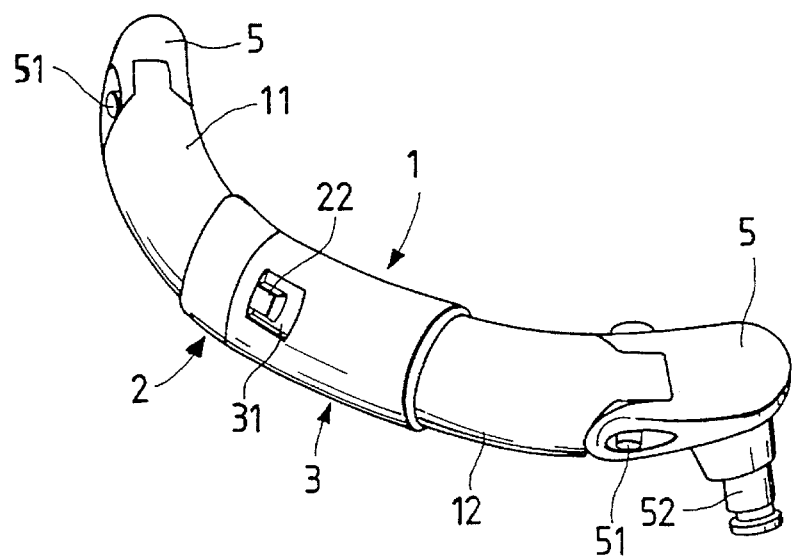
FIG. 2 is an enlarged perspective view of only the protective frame.

As shown in FIGS. 1–2, a protective frame 1 of a stroller is arranged so as to be split into two pole bodies 11, 12 by joint components 2 and 3 that are arranged so as to be engaged with each other. Retaining bodies 5, 5 are fastened to the base end portions of respective pole bodies 11, 12. The retaining bodies 5, 5 are releasably and rotatably attached to armrest poles 4.

The protective frame 1 is split into two pole bodies 11, 12 and has a length corresponding to the distance between the confronting armrest poles 4, 4. The retaining bodies 5,5 are coupled to the base end portions of the pole bodies 11, 12, respectively.

Figure 3:
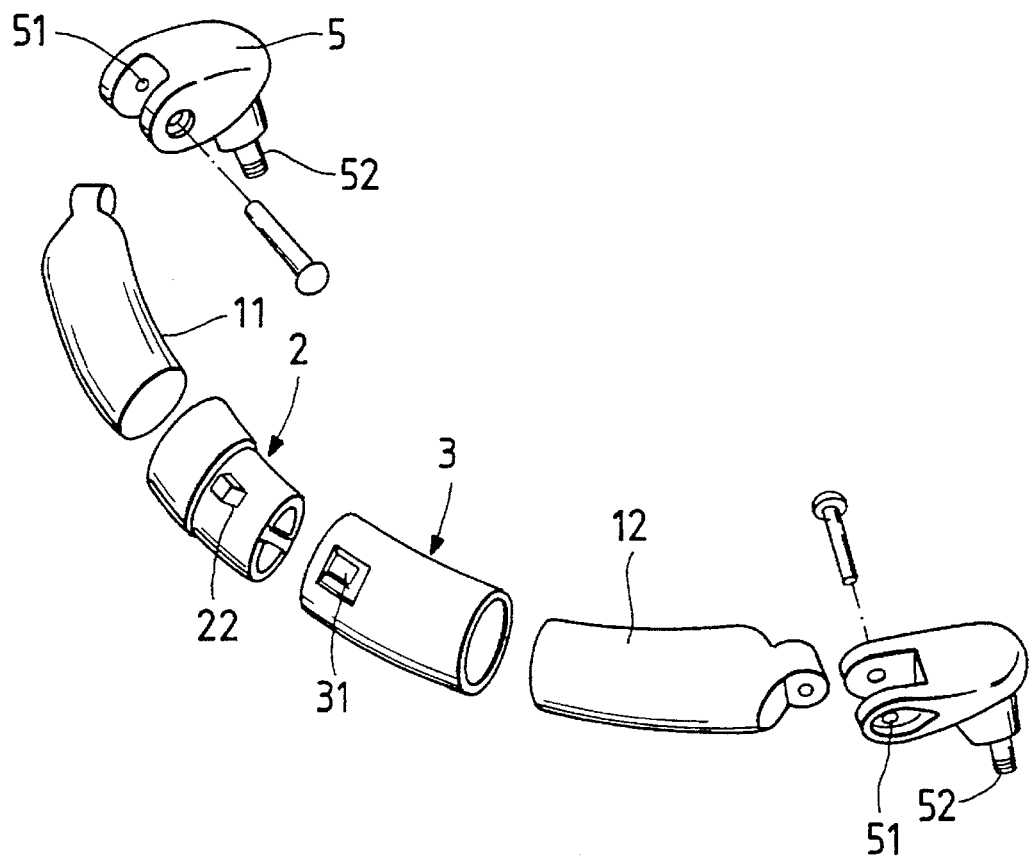
FIG. 3 is an enlarged exploded perspective view of a joint portion of the protective frame.
Figure 4:
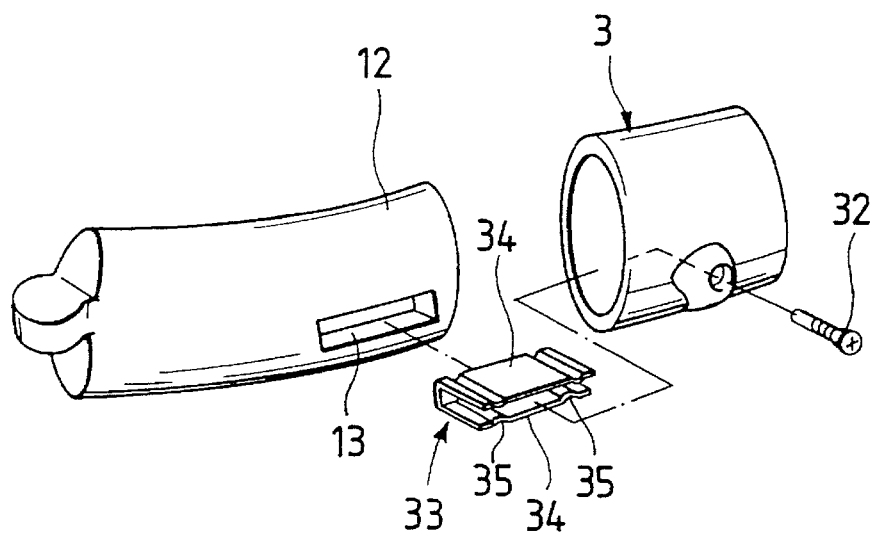
FIG. 4 is an exploded perspective view of a slidable joint component of the protective frame.

Each retaining body 5 is formed so that the front end thereof serves as a bifurcated support member 51 (see, FIG. 3). Either pole body 11 or 12 is supported at the bifurcated portion of the corresponding support portion 51 so that the base end portion of the pole body can be bent in only one direction.

The base end portion of the retaining body 5 has a cylindrical or rod-like shaft pole 52 attached to a front end portion of the armrest pole 4 so as to be pivotable about the shaft pole 52. When the joint component 2 is disengaged from the joint component 3, the two pole bodies 11 and 12 can pivot about the retaining bodies 5,5 attached to the armrest poles 4,4 (about the shaft poles 52, 52). More specifically, the two split pole bodies 11 and 12 are held by the retaining bodies 5, 5 on the front sides of the front end portions of the armrest poles so as to be suspended with the shaft pole 52 portion retained at an upper position and the joint component 2 or 3 retained at a lower position.

The joint components 2 and 3 attached to the front ends of the two pole bodies 11, 12 are arranged such that the joint component 2 attached to the front end of one pole body 11 serves as a fitting body fixed on the front end of the pole body 11 and the joint component 3 attached to the front end of the other pole body 12 serves as a cylindrical body into which the fitting joint component 2 fits.

A retaining projection 22 (FIGS. 2–5) is arranged on the front end of the fitting joint component 2. The retaining projection 22 is provided with an upward force at all times by the resiliency of a spring 21 incorporated in the joint component 2. When the joint component 2 is engaged with the joint component 3, the retaining projection 22 can be engaged with and retained in an engaging hole 31 formed in the front end of the joint component 3.

The joint component 3 into which the joint component 2 fits is designed to slide along the outer circumference of the pole body 12, and the engaging hole 31 for engaging the retaining projection 22 of the joint component 2 therewith is formed close to the front end thereof.

Reference numeral 32 designates a retaining shaft for retaining the joint component 3 in the pole body 12. The retaining shaft 32 serves also as a stopper for stopping the joint component 3 at a predetermined position of the pole body 12.

Figure 5:
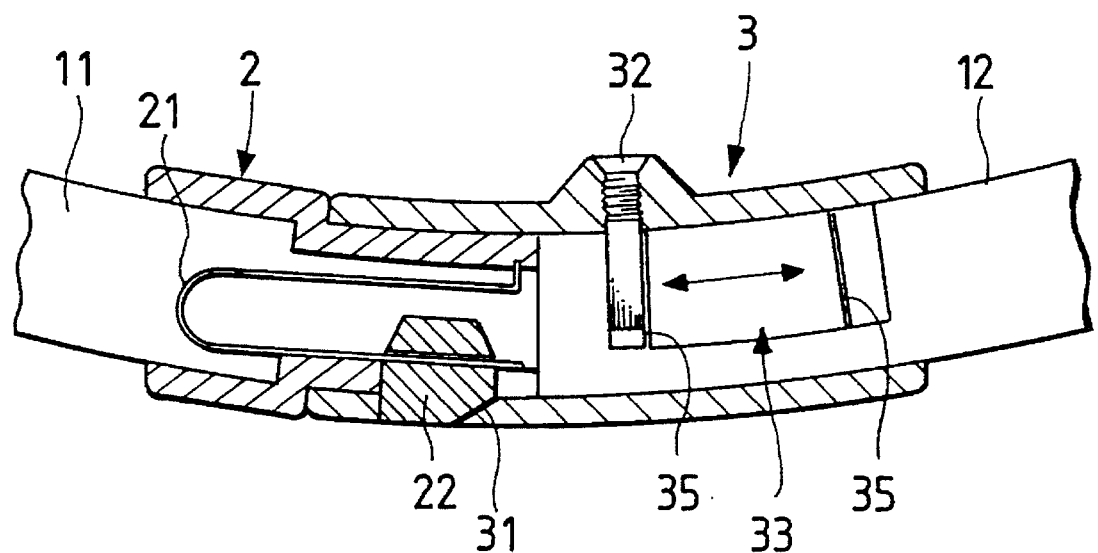
FIG. 5 is an enlarged sectional view of the joint portion.
Figure 6:
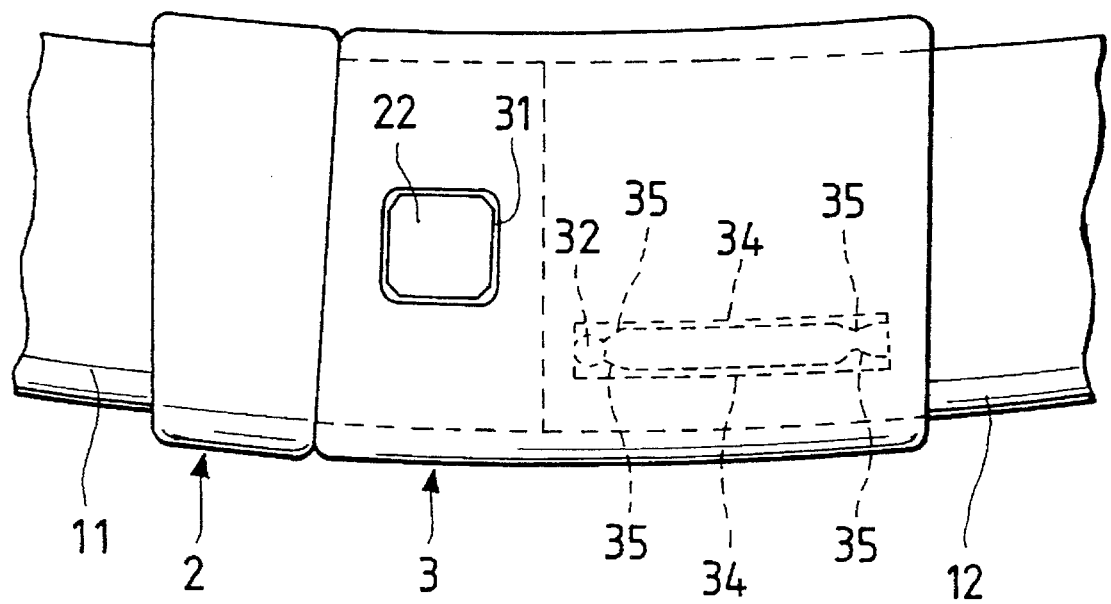
FIG. 6 is an enlarged plan view of the joint portion.

Reference numeral 33 designates a retaining plate that fits into a fitting groove 13 (FIG. 4) formed in the pole body 12. The retaining plate 33 is not only formed into a square U-shaped part having longer sides with the inner distance between two confronting wall surfaces 34, 34 equal to the diameter of the retaining shaft 32, but also portions close to both ends of each of the two confronting wall surfaces 34, 34 are slightly projected inward, making the portions outside the projected portions serve as stopper portions 35, 35 for stopping the retaining shaft 32 (FIGS. 5–6).

The device according to the embodiment described above is characterized in that it allows the protective frame 1 to be split into two parts in the middle thereof. Therefore, when a baby is to be placed in the seat, the protective frame 1 can be split into two parts and opened with ease to allow the baby to be quickly seated. This is accomplished first by disengaging the retaining projection 22 on the end of the joint component 2 formed in the middle of the protective frame 1 from the engaging hole 31 of the joint component 3 while pressing the retaining projection 22 down, and then by moving the joint component 3 backward along the frame pole 12.

Further, to return the released protective frame 1 to its initial condition, the cylindrical joint component 3 is slid forward away from the frame pole 12, and the front end of the joint component 3 is engaged with the front end of the joint component 2 attached to the front end of the frame pole 11. As a result, the retaining projection 22 on the end of the joint component 2 is automatically engaged with the engaging hole 31 in the front end of the joint component 3, thereby instantly completing the engagement of both components 2 and 3.

Further, not only is the retaining shaft 32 designed to be inserted into a space between inner surfaces formed by the two confronting wall surfaces 34, 34 (FIG. 6), but also the inner surfaces of the two confronting wall surfaces 34, 34 have slightly inwardly projected stopper portions 35, 35 formed thereon. Therefore, when the joint component 3 is slid along the frame pole 12 in a frontward direction (i.e., a direction so as to be engaged with the joint component 2), the retaining shaft 32 is securely stopped while moving in the frontward direction so as to surpass the stopper portion 35 formed at the front end of the retaining plate 33. On the other hand, when the joint component 3 is slid in a backward direction (i.e., a direction so as to be disengaged from the joint component 2), the retaining shaft 32 is securely stopped while moving rearward so as to surpass the stopper portion 35 formed at the rear end portion of the retaining plate 33. As a result, the joint component 3 does not move irregularly.

What is claimed is:

1. A protective frame for a stroller including a seat portion and a pair of armrest poles disposed on opposite sides of the seat portion, respectively, the protective frame comprising:

a pair of retaining bodies adapted to be releasably attached to the armrest poles respectively;

a pair of rigid pole bodies rotatably coupled at a first end thereof to said retaining bodies, respectively; and a joint mechanism for joining second, opposite ends of said pole bodies together, said joint mechanism being detachable into two separate joint portions.

2. The protective frame according to claim 1, wherein one of said joint portions includes a retaining projection, and the other one of said joint portions includes an engaging hole for receiving the retaining projection.

3. The protective frame according to claim 1, further comprising a pair of shafts, and said first ends of said pole bodies being coupled to said retaining bodies through said pair of shafts, respectively, so that each of said pole bodies is rotatable about only one axis.

4. The protective frame according to claim 1, wherein one of said pole bodies includes a recessed hole, and a retaining plate disposed within said recessed hole.

5. The protective frame according to claim 4, wherein said retaining plate has a substantially square U-shape.

6. The protective frame according to claim 5, wherein said retaining plate has a pair of confronting wall surfaces with slightly inwardly projecting stopper portions formed thereon.

7. The protective frame according to claim 1, wherein said retaining bodies are rotatably supported by armrest poles, respectively.

8. The protective frame according to claim 1, wherein said joint portions include a first joint portion and a second joint portion which are engageable with each other, said first joint portion being fixed to said second end of a first one of said pole bodies and wherein said protective frame further comprises means for slidably supporting said second joint portion on said second end of a second one of said pole bodies.

* * * * *